United States Patent
Ohta et al.

(10) Patent No.: US 6,639,758 B2
(45) Date of Patent: Oct. 28, 2003

(54) DISK DRIVE APPARATUS INCLUDING A LOAD/UNLOAD RAMP WITH DIFFERENT ANGLES FOR STANDARD AND DEPOPULATED VERSIONS

(75) Inventors: Mutsuro Ohta, Yokohama (JP);
Hiroshi Matsuda, Zama (JP);
Takahide Nakamura, Yokohama (JP);
Keishi Takahashi, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 262 days.

(21) Appl. No.: 09/791,993

(22) Filed: Feb. 21, 2001

(65) Prior Publication Data

US 2001/0015875 A1 Aug. 23, 2001

(30) Foreign Application Priority Data

Feb. 21, 2000 (JP) ..................................... 2000-043640

(51) Int. Cl.$^7$ ................................................. G11B 5/54
(52) U.S. Cl. ................................. 360/254.8; 360/254.9
(58) Field of Search ........................ 360/254.8, 255.7, 360/254.4, 255.3, 254.5, 254.9, 255.4, 255.8

(56) References Cited

U.S. PATENT DOCUMENTS 5,408,375 A * 4/1995 Asano ..................... 360/254.8
6,226,154 B1 * 5/2001 Albrecht .................. 360/254.8

* cited by examiner

Primary Examiner—A. J. Heinz
(74) Attorney, Agent, or Firm—Esther E. Klein; Lewis L. Nunnelley (57) ABSTRACT

The present invention provides a depopulation version hard disk drive apparatus that has a reduced number of magnetic heads and suspension arms from a standard hard disk drive apparatus, wherein the magnetic head can still be properly controlled during a loading state. The hard disk drive apparatus includes a ramp which interfaces with the suspension arm when loading and unloading the arm. An angle of a second slope surface 61c of the ramp in the depopulation version hard disk drive is set larger than that of the corresponding slope surface of the ramp 6 the a standard version hard disk drive.

1 Claim, 5 Drawing Sheets

(Prior Art)

FIG. 4b

(Prior Art)

(Prior Art)

DISK DRIVE APPARATUS INCLUDING A LOAD/UNLOAD RAMP WITH DIFFERENT ANGLES FOR STANDARD AND DEPOPULATED VERSIONS

BACKGROUND OF THE INVENTION

1. Field of the Invention

The present invention relates to a disk drive apparatus, preferably, a hard disk drive (HDD) employed as a data storing device of a computer. More particularly, the present invention relates to an HDD having a ramp shape that employs a head loading/unloading mechanism.

2. Description of Related Art of the Invention

The HDD is the most popular data storing means for computers. The HDD is structured so that a single or a plurality of magnetic disks are disposed on the same shaft and driven by a spindle motor therein. The capacity of the HDD is decided in accordance with the specifications of the subject computer in which the HDD is installed. Usually, the HDD is provided with one or more magnetic disks to satisfy the required capacity. For example, if 5 GB (gigabytes) is requested as the capacity of the HDD, five 1 GB magnetic disks (1 GB/disk) will be prepared. However, because there are a variety of computer specifications, 4 GB and 3 GB HDDs are also prepared.

The main components of a typical HDD are a magnetic disk and a spindle motor for driving the magnetic disk, and a case for holding and housing the magnetic disk, the motor, and other parts. This case is referred to as an enclosure case. One type of enclosure case can correspond to a plurality of capacity types. For example, if an enclosure case is designed in expectation that the HDD will be provided with five 1 GB magnetic disks so as to compose a 5 GB HDD, then the HDD will be provided with five 1 GB magnetic disks to comply with a requested capacity of 5 GB and with three 1 GB magnetic disks for a requested capacity of 3 GB. Such an HDD is referred to as a depopulation version HDD.

In a very compact and thin type HDD, for example, where the subject HDD is provided with a magnetic disk of 1 inch size, both sides of the magnetic disk are formed as recording surfaces and a magnetic head is prepared for each of those recording surfaces. If the capacity of one recording surface is 170 MB in such a thin type HDD, the HDD can have two capacity types; 340 MB and 170 MB. If a 340 MB HDD is defined as a standard one, the 170 MB HDD can be manufactured as a depopulation version of a 340 MB HDD in which only one side of the magnetic disk is used as a recording surface. In this case, the HDD has only one magnetic head for its one recording surface while the standard 340 MB HDD has two magnetic heads for its two recording surfaces.

Contact start-stop type disk drive apparatuses have been the main stream so far. In such a contact start-stop type disk drive apparatus, such a disk-like recording medium as a magnetic disk or the like is rotated, thereby generating an air bearing. The air bearing makes a head slider float from the surface of the disk so as to write data on the recording medium and read data from the recording medium. The head slider is mounted at a suspension arm composing a head arm of an actuator mechanism. In such a contact start-stop type HDD, however, the head slider is grounded on a save area on the disk surface when the rotation of the recording medium is stopped.

In a contact start-stop type disk drive apparatus, the head slider may possibly be sucked onto the surface of the data area and/or moved to the data area by a shock, thereby damaging the surface of the disk. To avoid such troubles and improve the reliability of the apparatus at the rest time, therefore, a load/unload type disk drive apparatus has been developed for commercial use. For example, such a load/unload type HDD is provided with a suspension arm for holding a magnetic head, as well as a part referred to as a ramp block. This HDD, while it is at rest, enables the ramp block to hold the suspension arm, thereby the head slider is prevented from touching the surface of the disk while the head slider is unloaded in the save area. The suspension arm has a load/unload tab having a projection and a ramp is formed at the ramp block. The ramp block is disposed so as to be close to the outer peripheral portion of the disk.

The loading/unloading mechanism, when the operation of the disk drive apparatus is stopped, rotates the suspension arm, thereby placing the projection of the load/unload tab of the suspension arm on the tab holding position so as to unload the head.

Figure 6:
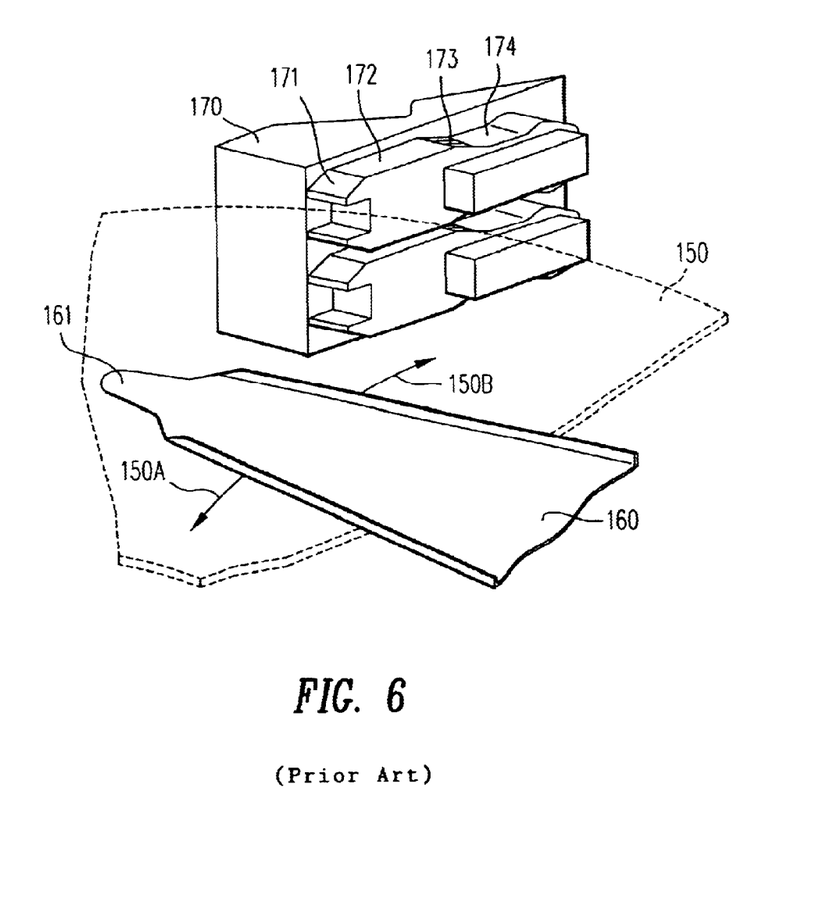
FIG. 6 is perspective views of the conventional magnetic disk, suspension arm, and ramp.

FIG. 6 shows a magnetic disk 150, a suspension arm 160, and a ramp 170. In FIG. 6, only one suspension arm 160 is shown so as to simplify the description for better understanding.

A load/unload tab 161 is formed at the suspension arm 160. The suspension arm 160 is rotated by a VCM (Voice Coil Motor not illustrated) in the radial direction of the magnetic disk 150, that is, towards 150A or 150B. At the ramp 170 are formed a load/unload surface consisting of a first slope surface 171, a flat surface 172, a second slope surface 173, and a supporting surface 174.

When data writing/data reading on/from the magnetic disk 150 is finished, the VCM rotates the suspension arm 160 towards 150B, that is, in the unloading direction. The load/unload tab 161 of the suspension arm 160 rubs against the flat surface 172 after climbing the first slope surface 171 of the ramp 170. The tab 161 then goes down the second slope surface 173 and stops on the supporting surface 174. At the time of starting writing/reading data on/from the magnetic disk 150, the load/unload tab 161 of the suspension arm 160, which has stopped on the supporting surface 174, climbs the second slope surface 173, then rubs against the flat surface 172, and goes down the first slope surface 171 to be loaded in the direction 150A.

Because the load/unload tab 161 of the suspension arm 160 rubs against the ramp 170 on the loading/unloading condition of the head, a friction torque is generated between them. Therefore, the driving force of the head driving mechanism including the VCM is determined by taking this friction torque into consideration.

In case of a 1-inch-diameter HDD as described above, if the HDD is provided with two magnetic heads, the HDD has two suspension arms 160. Therefore, if a friction torque Tf is generated when one suspension arm 160 climbs the second slope surface 173 on the loading condition of the head, the total friction torque will become 2Tf. Consequently, the head driving mechanism including the VCM must have a driving force enough to load the suspension arms 160 against this 2Tf.

However, if the HDD is a depopulation type one provided with only one magnetic head, the HDD has only one suspension arm 160. The total friction torque will thus become Tf. The head driving mechanism of the depopulation version HDD conforms to that of an HDD provided with two magnetic heads. At the time of loading the head, a current is applied to the VCM and when the suspension arm 160 reaches the flat surface 172, the speed of the suspension arm 160 is detected with use of the counter electromotive force of the VCM. After that, the speed of the suspension arm 160, that is, a current supplied to the VCM is controlled. Consequently, if the HDD is provided with only one magnetic head, thereby the total friction torque becomes a half of that of an HDD provided with two magnetic heads, then the suspension arm 160, that is, the magnetic head reaches the magnetic disk 150 before the power supplied to the VCM is controlled. As a result, the current might not be controlled in some cases.

In case of a 1-inch-diameter HDD, the HDD is manufactured basically as an analog of, for example, an 2.5-inch-diameter disk HDD. Consequently, the diameter of the coil composing the VCM becomes small just like in the 2.5-inch-diameter HDD. The counter electromagnetic force obtained from the VCM is in proportion to the square of the coil diameter. For example, if the diameter of the coil of a 2.5-inch-diameter HDD is 2.5 mm, the diameter of the coil of a 1-inch-diameter HDD is 1 mm. The counter electromagnetic force obtained from the 1-inch-diameter HDD is thus about 16% of that of the 2.5-inch-diameter HDD. Concretely, almost no counter electromagnetic force can be expected from the 1-inch-diameter HDD. Because the 1-inch-diameter HDD is thin in structure, the VCM is also thin. This is why the problem of the counter electromagnetic force appears more apparently.

When the power of an HDD is turned off abruptly, the head is unloaded usually with use of the counter electromagnetic force of the VCM, which is generated by a spindle motor. However, because almost no counter electromagnetic force can be expected from such a 1-inch-diameter HDD as described above, a method is proposed so that a current accumulated in a capacitor beforehand is supplied to the VCM, thereby unloading the head. The current supplied to the VCM at this time is the same between one-head HDD and two-head HDD. Consequently, if the friction torque is reduced, the speed of the suspension arm 160 is raised relatively on the unloading condition of the head. Such the HDD has been confronted with a problem that although the HDD is provided with a member referred to as an outer crush stop for limiting the suspension arm 160 in movement, the suspension arm 160, if the speed is fast, hits against the outer crush stop and bounces back onto the magnetic disk 150, thereby there is a problem that the apparatus cannot be started up.

Under such circumstances, it is an object of the present invention to provide a disk drive apparatus and manufacturing method thereof employed for a depopulation version HDD provided with less magnetic heads and suspension arms than the standard HDD so that the disk drive apparatus can control each magnetic head properly when the head is loaded and prevent the suspension arm from bouncing back onto the magnetic disk when its power supply is turned off.

SUMMARY OF THE INVENTION

The disk drive apparatus of the present invention is a depopulation version disk drive apparatus, comprising a disk-like medium for storing information; a head for writing/reading information on/from the disk-like medium; a suspension arm for supporting the head; a head driving mechanism for loading/unloading the head on/from the disk-like medium via the suspension arm; and a ramp for supporting the suspension arm when the head is unloaded and having a slope against which the suspension arm rubs when the head is loaded. The disk drive apparatus employs the same specifications as those of the standard disk drive apparatus except that the disk drive apparatus of the present invention is provided with less heads and less suspension arms than those of the standard disk drive apparatus. In addition, the disk drive apparatus of the present invention is composed so as to have the same friction torque between the ramp and the suspension arm as that of the standard disk drive apparatus when the head is loaded respectively. In order to make the friction torque equal between the depopulation version disk drive apparatus and the standard disk drive apparatus, the angle of the ramp slope surface of the depopulation version disk drive apparatus can be set larger than that of the standard disk drive apparatus. Concretely, because a friction torque is in proportion to a slope angle, the angle of the ramp slope surface of the depopulation version disk drive apparatus is set larger as described above, thereby increasing the friction torque.

It is another object of the present invention to provide a method for manufacturing a disk drive apparatus that employs a mechanism for loading/unloading the suspension arm provided with a read/write head onto/from a disk-like recording medium. This manufacturing method is intended for a series of hard disk drives wherein the number of heads is different mutually among them. The difference is based on the number of recording surfaces of the disk-like recording medium. A ramp is composed such that if the angle of the ramp slope surface of a series of disk drive apparatuses provided with less heads is defined as $\alpha 1$ and that of a series of the disk drive apparatuses provided with more heads is defined as $\alpha 2$, the relationship between those angles becomes $\alpha 1 > \alpha 2$.

For example, if a standard disk drive apparatus is provided with three disk-like recording media, then a disk drive apparatus provided with two or only one disk-like recording medium could become a depopulation version disk drive apparatus. In this case, the standard disk drive apparatus composes a series, the disk drive apparatus provided with two disk-like recording media composes another series, and the disk drive apparatus provided with only one disk-like recording medium composes further another series. The present invention can apply to such a series of disk drive apparatuses. Although the number of disk-like recording media is used for classifying series of disk drive apparatuses here so as to simplify the description, a disk-like medium enables recording surfaces to be formed on both face and back sides thereof. The number of recording surfaces may thus be used for classifying such series of disk drive apparatuses.

The above method for manufacturing a disk drive apparatus can apply to both series of disk drive apparatuses provided with less heads and series of disk drive apparatuses provided with more heads if the specifications of the mechanism for loading/unloading the suspension arm on/from a disk-like medium are the same between both series of disk drive apparatuses.

The disk drive apparatus and the disk drive apparatus manufacturing method of the present invention described above are preferred for a compact thin type HDD whose disk is 1 inch or under in diameter. Concretely, the present invention can provide a one-head hard disk drive, comprising a magnetic disk of 1 inch or under in diameter, provided with a magnetic recording layer on its one side; a magnetic head for writing/reading information on/from the magnetic recording layer of the magnetic disk; a suspension arm for supporting the magnetic head; a head driving mechanism for loading/unloading the head on/from the magnetic disk via the suspension arm; and a ramp for supporting the suspension arm when the head is unloaded, the ramp having a slope surface against which the suspension arm rubs when the head is loaded. Furthermore, in the one-head hard disk drive of the present invention, when it is compared with a two-head hard disk drive conforms thereto except that a magnetic recording layer is provided on both face and back surfaces of the magnetic disk, which is 1 inch in diameter, a pair of magnetic heads and suspension arms are provided so as to correspond to those face and back recording surfaces, and the ramp shape is different. The angle of the slope surface in the ramp of the former is set larger than that of the latter.

Furthermore, according to the present invention, it is possible to provide a new hard disk drive, comprising a magnetic disk of 1 inch or under in diameter, provided with a magnetic recording layer on its one side; a magnetic head for writing/reading information on/from the magnetic recording layer of the magnetic disk; a suspension arm for supporting the magnetic head; a head driving mechanism for loading/unloading the head on/from the magnetic disk via the suspension arm; and a ramp for supporting the suspension arm when the head is unloaded, the ramp having a load/unload surface against which the suspension arm rubs. In such a hard disk drive, the ramp can be provided with a limiter for limiting the suspension arm in vertical movement. In addition, the load/unload surface of the ramp can include a slope surface and the limiter can have a slope surface corresponding to the slope surface of the ramp.

DETAILED DESCRIPTION OF THE PREFERRED EMBODIMENT

Figure 1:
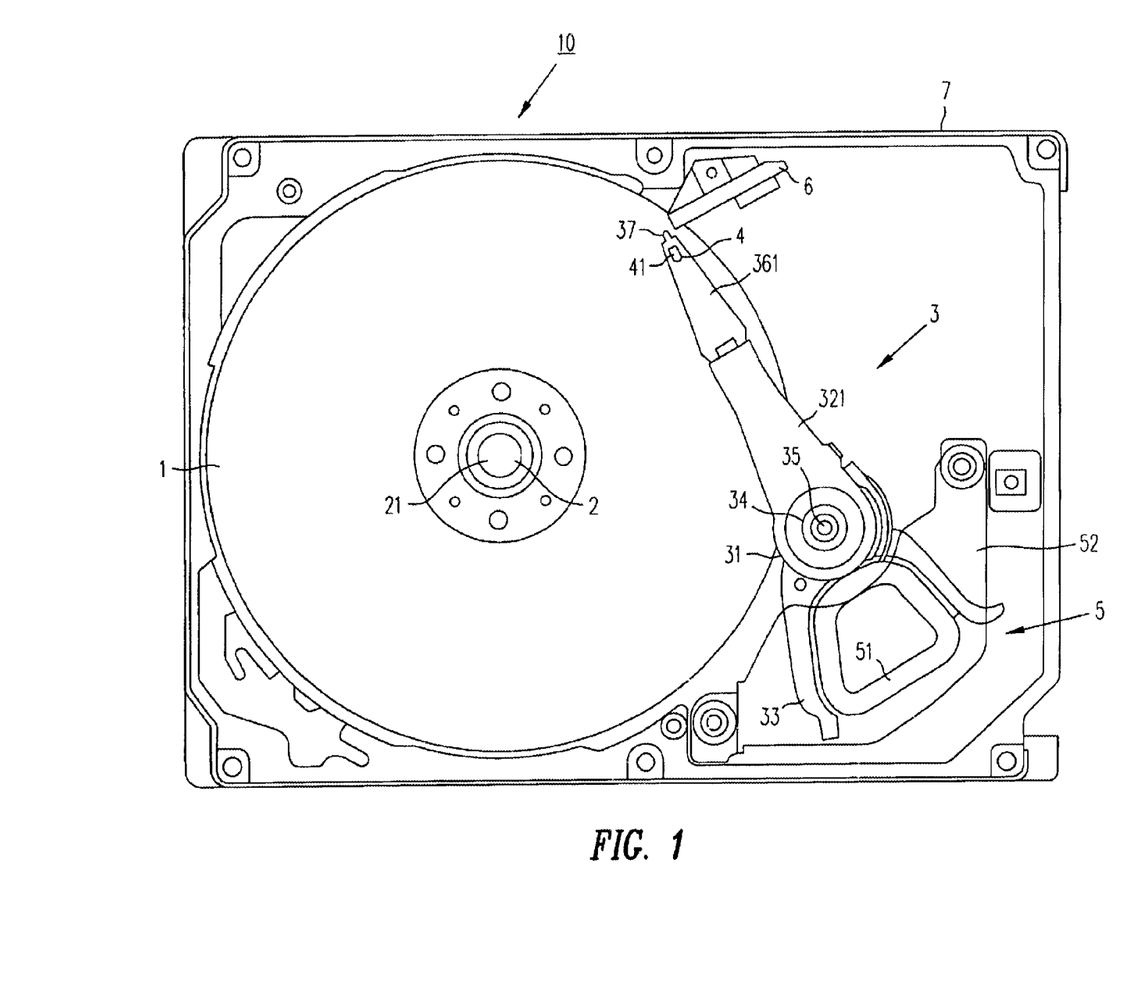
FIG. 1 is a top view of a hard disk drive apparatus in an Embodiment of the present invention.
Figure 2:
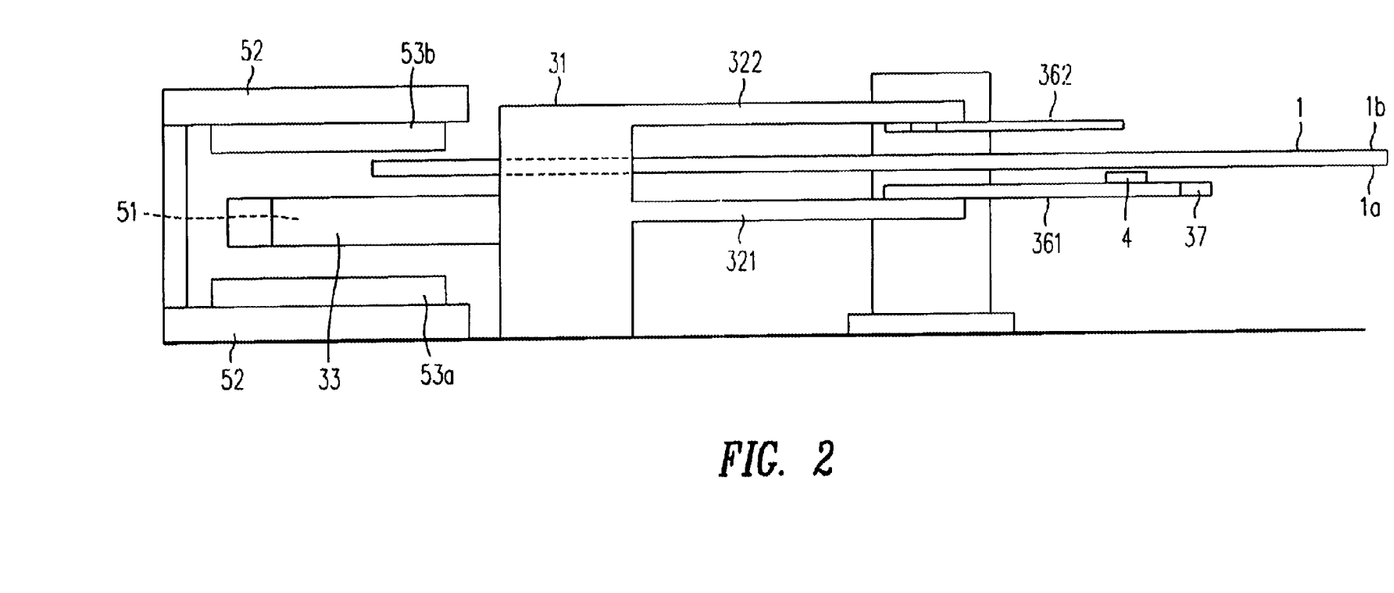
FIG. 2 is a cross sectional view of a carriage of the hard disk drive apparatus in the embodiment of the present invention.
Figure 3A:
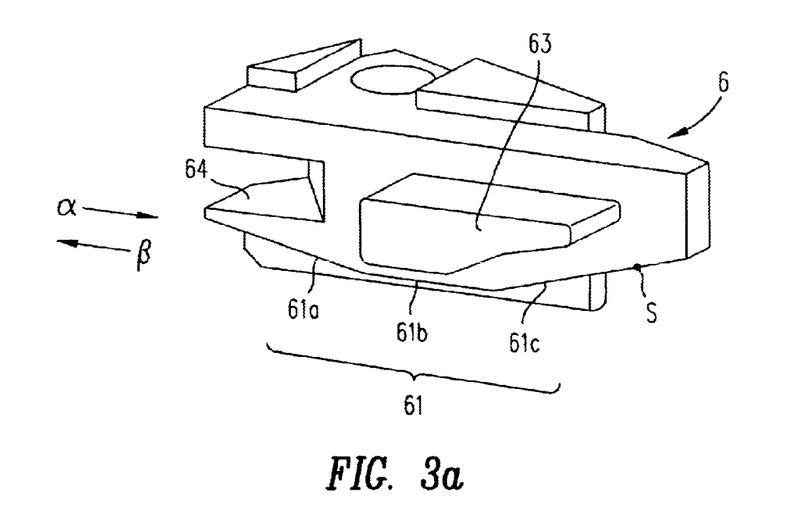
FIGS. 3a & 3b illustrate ramps in the embodiment of the present invention.
Figure 3B:
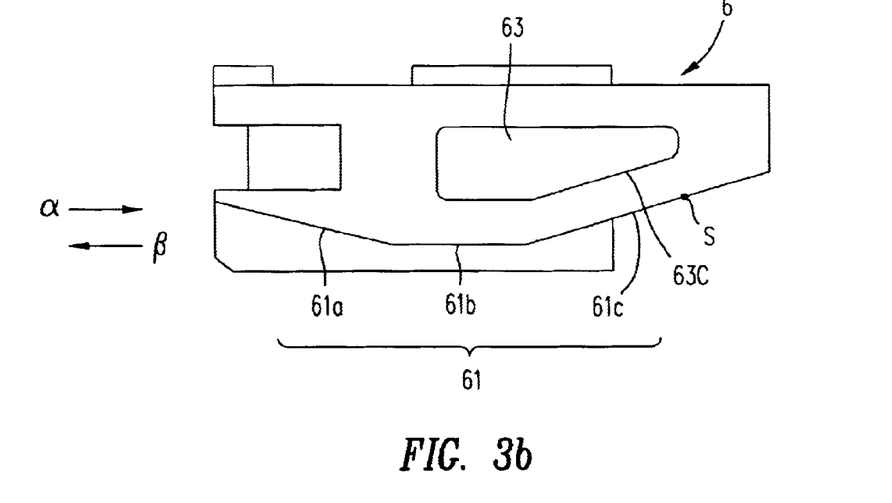

Hereunder, the Embodiments of the present invention applied to an HDD will be described in detail with reference to the accompanying drawings. FIG. 1 is a top view of a schematic block diagram of an HDD in an embodiment of the present invention. FIG. 2 is a cross sectional view of a structure of a carriage 3. FIG. 3 are views of a ramp 6.

As shown in FIGS. 1 and 2, the HDD 10 employed as a disk drive apparatus comprising a magnetic disk 1, a spindle motor 2, a carriage 3, a head slider 4, a VCM 5, and a ramp 6, which is related to the present invention, is housed in an enclosure case 7.

The magnetic disk 1 is fixed to the outer periphery of a spindle shaft 21 of the spindle motor 2 disposed at the bottom of the enclosure case 7. This spindle motor 2 rotates the magnetic disk 1. This magnetic disk 1 is 1 inch in diameter and a magnetic recording layer is formed on its back side. The capacity of the magnetic disk 1 is varied as follows; 170 MB on one side, 340 MB on both sides, 500 MB on one side, and 1 GB on both sides.

The carriage 3, as shown in FIGS. 1 and 2, is composed of an intermediate portion 31, two carriage arms 321 and 322 extended from one end of the intermediate portion 31 in a shape of a comb, and a coil arm 33 extended from the other end of the intermediate portion 31. The intermediate portion 31 is fit rotatably in a rotary shaft 35 protruded from the bottom of the enclosure case 7 with a bushing 34 there between. A voice coil 51 is mounted at the coil arm 33. FIG. 1 shows part of the carriage 3 disposed at the back side of the magnetic disk 1 in detail.

As shown in FIG. 2, at the tip portion of the carriage arm 321 is attached a suspension arm 361 so as to correspond to the face side 1a of the magnetic disk 1. At the tip of this suspension arm 361 is formed a load/unload tab 37.

If the magnetic disk 1 is provided with a magnetic recording layer on both face and back sides respectively, a suspension arm is also attached to the tip portion of the carriage arm 322. The HDD 10 in this Embodiment of the present invention is a depopulation version one, so the number of magnetic heads and suspension arms are reduced from those of the standard HDD. In this Embodiment, a dummy arm 362 is attached to the carriage arm 322 so that the mass of the carriage arm 322 remains the same even when a suspension arm is attached to the carriage arm 322.

On the face side of the suspension arm 361 is mounted a head 41 slider 4 provided with a magnetic head 41 for reading/writing information from/on the magnetic disk 1. The magnetic head 41 is connected to a controller which not illustrated.

Permanent magnets 53a and 53b are fixed to the inner surface of a yoke 52 disposed at the bottom of the enclosure case 7. The coil arm 33 is inserted between those permanent magnets 53a and 53b. The voice coil 51 and the permanent magnets 53a and 53b are combined to compose a VCM 5. This VCM 5 rotates the carriage 3 and moves the head slider 4 substantially in the radial direction of the magnetic disk 1. The voice coil 51 is connected to a VCM driver (not illustrated), which is a supply source of a VCM current.

FIG. 3 shows the entire structure of the ramp 6. FIG. 3(a) is a perspective view and FIG. 3(b) is a side view of the ramp 6. The ramp 6 has a load/unload surface 61 composed of a first slope surface 61a, a flat surface 61b, and a second slope surface 61c; a limiter 63; and a magnetic disk passage groove 64. Concretely, this ramp 6 has only one load/unload surface 61 when the subject HDD is provided with only one magnetic head 41.

The arrows in FIG. 3 show the moving directions of the suspension arm 361 when the head is loaded and unloaded. The arrow α shows the direction when the head is unloaded and the arrow β shows the direction when the head is loaded. The letter S shown on the load/unload surface 61 shows a position on which the load/unload tab 37 of the suspension arm 361 stops when the head is unloaded.

Hereunder, a description will be made for how the load/unload tab 37 will move on the ramp 6 when the head is loaded/unloaded.

At first, the load/unload tab 37 begins moving from the position S when the head is loaded. The tab 37 then climbs the second slope surface 61c by rubbing against the surface 61c. Consequently, the second slope surface 61c is defined as a slope surface against which the suspension arm 361 rubs to climb thereon when the magnetic head 41 is loaded. In FIG. 3, the load/unload tab 37 goes down the slope surface 61c, but the tab 37 receives an upward load at this time in FIG. 3. In the present invention, climbing means a movement in the direction in which the load is increasing. After climbing the second slope surface 61c, the tab 37 rubs the flat surface 61b. Passing the flat surface 61b, the load/unload tab 37 rubs against the slope surface 61a to go down the slope 61a. After that, the magnetic head 41 is loaded in the direction β, that is, onto the magnetic disk 1.

When the head is unloaded, the load/unload tab 37 moves along the arrow α from the magnetic disk 1, reaching the first slope surface 61a, then climbing the surface 61a by rubbing against the surface 61a. Passing the slope surface 61a, the tab 37 rubs against the flat surface 61b. Passing the flat surface 61b, the tab 37 goes down the second slope surface 61c by rubbing against the surface 61c, then stops at the position S. The suspension arm 361 is thus held at the position S on the ramp 6 until the next loading of the magnetic head.

As described above, the HDD 10 is a depopulation version one. Unlike the HDD 10, an HDD which is the standard (hereafter, to be referred to as the standard HDD) of such depopulation version HDD 10 has a magnetic recording layer on both face and back sides thereof. And, this difference makes it possible to reduce the number of magnetic heads and suspension arms in the HDD 10 from those of the standard HDD. Other specifications of the HDD 10 are the same as those of the standard HDD. The specifications of the HDD 10 include a mechanism for loading/unloading the head, that is, a carriage 3, as well as the VCM 5 and a current supplied to the VCM 5.

Figure 4A:
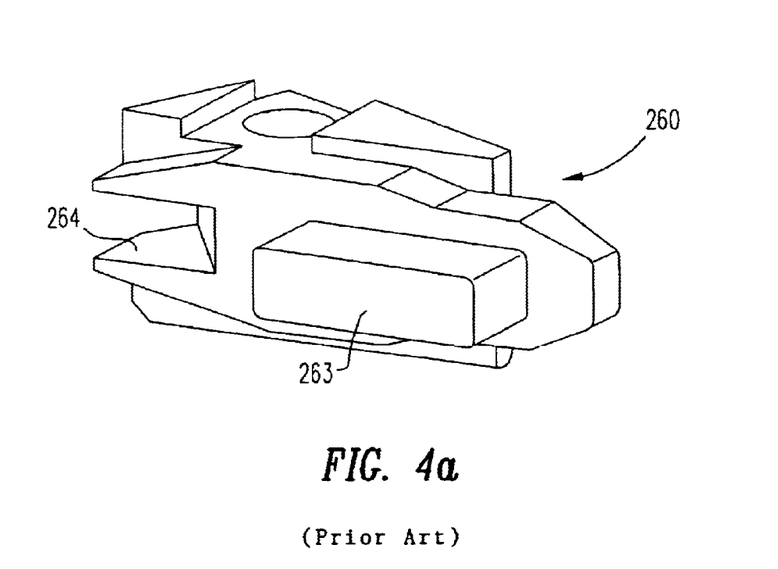
FIGS. 4a & 4b illustrate ramps employed for the conventional standard HDD.
Figure 4B:
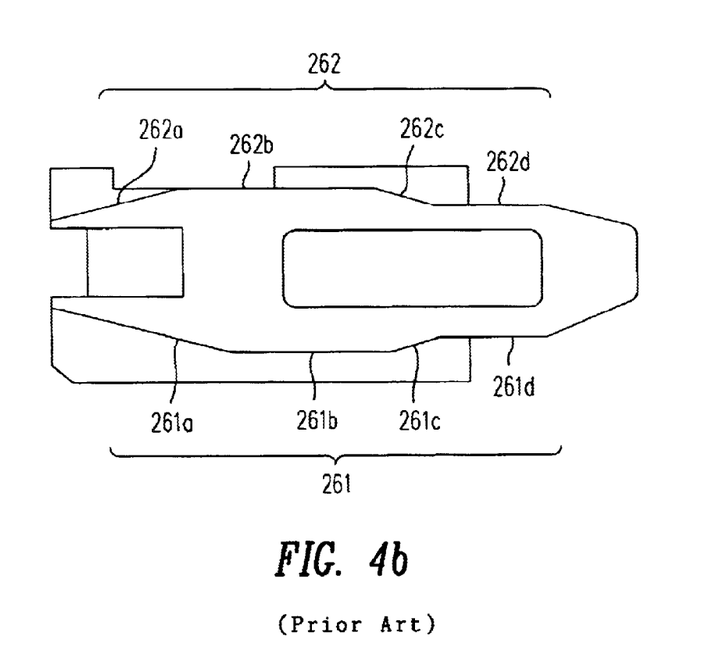

FIG. 4 shows a ramp 260 employed for the standard HDD. FIG. 4(a) is a perspective view and FIG. 4(b) is a side view of the ramp 260. The ramp 260 is composed of a first load/unload surface 261, a second load/unload surface 262, a limiter 263, and a magnetic disk passage groove 264. The first load/unload surface 261 is composed of a first slope surface 261a, a flat surface 261b, a second slope surface 261c, and a holding surface 261d. The second load/unload surface 262 is composed of a first slope surface 262a, a flat surface 262b, a second slope surface 262c, and a holding surface 262d. The ramp 260 has two load/unload surfaces 261 and 262. This is because the standard HDD has a magnetic disk provided with two magnetic recording layers formed on both face and back sides thereof and it is provided with a pair of magnetic heads and suspension arms corresponding to those face and back recording sides.

In the standard HDD, each of the load/unload tabs of the pair of suspension arms begins moving from a predetermined position on the holding surface 261d, 262d when the magnetic head is loaded, then climbing the second slope surface 261c, 262c by rubbing against the slope 261c, 262c. The mechanism for loading/unloading the magnetic head in the standard HDD outputs a driving force enough to let each suspension arm to climb the surface. Because the standard HDD has two suspension arms, this driving force is decided by taking a friction torque into consideration. The friction torque is generated when the two load/unload tabs rub against the second slope surfaces 261c and 262c.

The HDD 10 employs such the driving mechanism for outputting this driving force as is. The HDD 10 has only one suspension arm 361 that rubs against the ramp 6. In addition, if the angle of the second slope surface 61c of the ramp 6 is set equal to that of the second slope surface 261c of the standard HDD, the friction torque generated by the load/unload tab 37 rubbing against the second slope surface 61c in the HDD 10 becomes a half of that of the standard HDD. Consequently, when the angle of the slope surface 261c is set as described above, the driving force of the driving mechanism exceeds the friction torque significantly and the speed of the suspension arm 361, that is, the carriage 3 becomes excessively large when the head is loaded, thereby it might be difficult to control the speed of the carriage 3.

This is why the HDD 10 in this Embodiment sets the angle of the second slope surface 61c of the ramp 6 larger than that of the second slope surface 261c of the ramp 260 of the standard HDD so that the same torque is generated in both HDD 10 and standard HDD. As a result, the speed of the carriage 3 becomes equal to that of the standard HDD, thereby the speed of the carriage 3 can be controlled. This means that the control is also effective when the power supply of the HDD 10 is turned off and the head is loaded. Concretely, when a current accumulated in a capacitor is supplied to the VCM 5 so as to unload the head, if the speed of the carriage 3 is excessively fast, the carriage 3 does not stop, but it hits against the outer crush stop (not illustrated), so that the carriage 3 bounces back onto the magnetic disk 1. To solve this problem, therefore, the angle of the second slope surface 61c of the ramp 6 is set larger than that of the second slope surface 261c of the ramp 260 in the standard HDD. Bouncing of the carriage 3 onto the magnetic disk 1 can thus be prevented. The ramp 6 is a low cost part in the HDD 10. According to the present invention, therefore, employment of such a low cost part will also be effective to solve the above conventional problem. This is an embodiment of the present invention.

Figure 5:
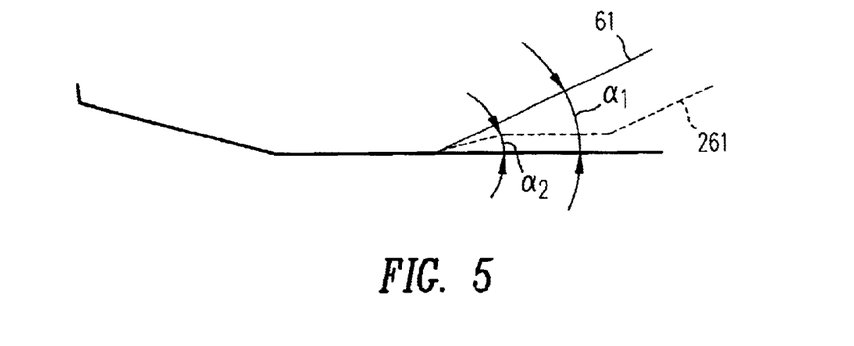
FIG. 5 illustrates a profile of a load/unload surface of the ramp in the embodiment of the present invention and a profile of a load/unload surface of the conventional ramp; both profiles are put on each other.

FIG. 5 shows a profile of the load/unload surface 61 of the ramp 6 and a profile of the first load/unload surface 261 of the ramp 260; both profiles are put on each other. In FIG. 5, the angle $\alpha1$ of the second slope surface 61c of the load/unload surface 61 is set larger than the angle $\alpha2$ of the second slope surface 261c of the load/unload surface 261 ($\alpha1 > \alpha2$).

In this Embodiment, the slope angle is set specially as described above so that the same friction torque is assumed between the HDD 10 and the standard HDD. However, for example, the same effect can also be obtained by changing the material of the ramp, the roughness of the slope surface, the profile of the slope surface, etc., thereby increasing the friction coefficient.

The limiter 63 of the ramp 6 in this Embodiment has a slope surface 63c that is substantially in parallel to, that is, corresponding to the second slope surface 61c. And, this limiter 63 prevents the suspension arm 361 from moving in the vertical direction when a shock is applied to the HDD 10. This is why the limiter 63 having such a slope surface 63c corresponding to the second slope surface 61c can minimize the vertical movement of the suspension arm 361.

In the Embodiment described above, a description is made for the HDD 10 in which only a 1-inch-diameter magnetic disk 1 is mounted. However, the present invention is not limited only to that; the present invention can also apply to an HDD in which a plurality of 2.5- or 3.5-inch-diameter magnetic disks are mounted. Concretely, the present invention can apply widely to depopulation version disk drive apparatuses. More concretely, if a series of depopulation version disk drive apparatus (HDD 10 in this Embodiment) is manufactured on the basis of a series of standard disk drive apparatuses, then it is only needed to decide the angle of the slope surface of the ramp according to the present invention.

As described above, according to the present invention, the head can be controlled properly on the loading condition and prevented from bouncing onto the magnetic disk on the unloading condition in a depopulation version HDD in which the number of heads and suspension arms are reduced from those in the standard HDD.

What is claimed is:

1. A disk drive apparatus having a depopulation version and a standard version, comprising:

at least one disk-like medium for storing information;

at least one head for writing data on said disk-like medium and reading data from said disk-like medium;

at least one suspension arm for supporting said head, wherein the number of heads and the number of suspension arms in the depopulation version are decreased from those of the standard version, wherein each said suspension arm has a tip, and wherein each said suspension arm includes a load/unload tab located at the tip of said suspension arm;

a head driving mechanism for loading said head on said disk-like medium or unloading said head from said disk-like medium via said load/unload tab on each said suspension arm, a first ramp for supporting said suspension arm when unloading said head in said standard version of said disk drive apparatus, said first ramp having a first slope surface with a first angle on which said suspension arm climbs when loading said head; and, a second ramp for supporting said suspension arm when unloading said head in depopulated version of said disk drive apparatus, said second ramp having a second slope surface with a second angle on which said suspension arm climbs when loading said head, wherein said second angle is greater than said first angle.

* * * * *